United States Patent Office 3,549,637
Patented Dec. 22, 1970

3,549,637
2-THIO SUBSTITUTED-TETRAHYDRO-HALO-SULFAMYL-QUINAZOLINONES
Bola Vithal Shetty, Rochester, N.Y., assignor to Pennwalt Corporation, East Orange, N.J., a corporation of Pennsylvania
No Drawing. Filed Mar. 11, 1968, Ser. No. 711,839
The portion of the term of the patent subsequent to July 29, 1977, has been disclaimed and dedicated to the Public
Int. Cl. C07d 51/48
U.S. Cl. 260—256.5                                6 Claims

ABSTRACT OF THE DISCLOSURE

A 1,2,3,4-tetrahydro-halo-sulfamyl-4-quinazolinone having diuretic properties, characterized by having in the 3-position a substituted or unsubstituted aryl or aralkyl group, and by having in the 2-position an alkylthio, aralkylthio, arylthio or cycloalkylthio, or cycloalkylalkylthio.

---

This invention relates to 1,2,3,4-tetrahydro-6-sulfamyl-3-aryl or aralkyl-4-quinazolinone compounds having diuretic properties, and more particularly to such compounds substituted in the 7- position with halogen or haloalkyl and in the 2-position with alkylthio, phenylthio, phenylalkylthio, cycloalkylthio, or cycloalkylalkylthio groups.

In applicant's copending application Ser. No. 517,995, filed Jan. 3, 1966, now U.S. Pat. No. 3,360,518, there are disclosed and claimed compounds of the above type having a thioalkyl group, such as methylthiomethyl or benzylthiomethyl, in the 2-position. These compounds are effective diuretics.

Applicant found that the compounds of his application Ser. No. 517,995 have useful diuretic characteristics regardless of whether there is a thioalkyl group or an alkylthio, phenylalkylthio, phenylthio or cycloalkylthio group in the 2- position.

In accordance with this invention 1,2,3,4-tetrahydro-7-halo or haloalkyl-6-sulfamyl-3-aryl or aralkyl-4-quinazolinone compounds have alkylthio, aralkylthio, arylthio, cycloalkylthio or cycloalkylalkylthio groups in the 2-position. These compounds are effective diuretics.

The preferred compounds of this invention have the formula:

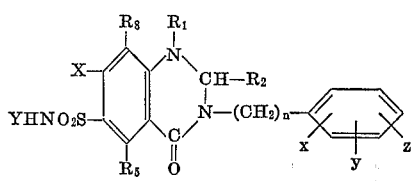

or the pharmaceutically acceptable salts thereof; in which X is halogen or trifluoromethyl; Y is hydrogen or loweralkyl; $R_1$ is hydrogen or loweralkyl; $R_2$ is alkylthio, phenylthio, phenylalkylthio, cycloalkylthio, cycloalkyl-alkylthio, or such groups having halogen, loweralkyl, amino, sulfamyl, or nitro groups substituted in the phenyl ring or in the cycloalkyl ring, or in the alkyl group; $R_5$ and $R_8$ are hydrogen, loweralkyl, loweralkoxy, loweralkoxyalkyl; $x$ is hydrogen, loweralkyl, hydroxy, loweralkoxyalkyl, loweralkoxy, $NH_2$, $SO_2NH_2$, halogen or trifluoromethyl; $y$ anr $z$ are any of $x$, and $n$ is an integer from 0–4.

In the above formula X is preferably chlorine or trifluoromethyl, but bromine and the other halogens are not precluded. $R_1$ is preferably hydrogen, but loweralkyls such as methyl, ethyl, propyl, and isopropyl may be used. $R_2$ is preferably loweralkylthio such as methylthio or lowercycloloweralkylthio such as cyclopropylmethylthio, or benzylthio. The halogen of the halogen substituted alkyl is chlorine or other halogen. The aryl or aralkylthio is preferably a monocyclic carbocyclic aryl loweralkyl, e.g., benzylthio, $x$, $y$, and $z$ may be any of the stated radicals in one or more of the ortho, meta or para positions. Preferably $x$ is methyl in the ortho position, also where sulfamyl is used it is preferably present in the meta or para position with methyl in the ortho position.

Specific suitable compounds of the above formula include 2-methylthio-3-o-tolyl-6-sulfamyl-7-chloro-1,2,3,4-tetrahydro-4-quinazolinone;
2-methylphenylthio-3-o-tolyl-6-sulfamyl-7-trifluoromethyl-1,2,3,4-tetrahydro-4-quinazolinone;
2-phenylthio-3-o-tolyl-6-sulfamyl-7-chloro-1,2,3,4-tetrahydro-4-quinazolinone;
2-ethylphenylthio-3-o-tolyl-6-sulfamyl-7-trifluoromethyl-1,2,3,4-tetrahydro-4-quinazolinone;
2-ethylphenylthio-3-o-tolyl-6-sulfamyl-7-chloro-1,2,3,4-tetrahydro-4-quinazolinone;
2-methylthio-3-o-tolyl-6-methylaminosulfonyl-7-chloro-1,2,3,4-tetrahydro-4-quinazolinone;
2-methylthio-3-(p-chlorophenyl)-6-sulfamyl-7-chloro-1,2,3,4-tetrahydro-4-quinazolinone;
2-methylthio-3-o-tolyl-6-methylaminosulfonyl-7-chloro-1,2,3,4-tetrahydro-4-quinazolinone;
2-methylthio-3-phenyl-6-sulfamyl-7-chloro-1,2,3,4-tetrahydro-4-quinazolinone;
2-methylthio-3-(2'-methyl-3'-chlorophenyl)-6-sulfamyl-7-chloro-1,2,3,4-tetrahydro-4-quinazolinone;
2-methylthio-3-(p-chlorophenyl)-6-methylaminosulfonyl-7-chloro-1,2,3,4-tetrahydro-4-quinazolinone;
2-methylthio-3-(2'-methylbenzyl)-6-sulfamyl-7-chloro-1,2,3,4-tetrahydro-4-quinazolinone;
2-phenylthio-3-o-tolyl-6-sulfamyl-7-chloro-1,2,3,4-tetrahydro-4-quinazolinone;
2-propylthio-3-o-tolyl-6-sulfamyl-7-chloro-1,2,3,4-tetrahydro-4-quinazolinone;
2-butylthio-3-o-tolyl-6-sulfamyl-7-chloro-1,2,3,4-tetrahydro-4-quinazolinone;
2-propylthio-3-o-tolyl-6-sulfamyl-7-trifluoromethyl-1,2,3,4-tetrahydro-4-quinazolinone;
2-butylthio-3-o-tolyl-6-sulfamyl-7-trifluoromethyl-1,2,3,4-tetrahydro-4-quinazolinone;
2-benylthio-3-o-tolyl-6-sulfamyl-7-chloro-1,2,3,4-tetrahydro-4-quinazolinone;
2-(2,2,2-trifluoroethylthio)-3-o-tolyl-6-sulfamyl-7-chloro-1,2,3,4-tetrahydro-4-quinazolinone;
2-ethylthio-3-o-tolyl-6-sulfamyl-7-chloro-1,2,3,4-tetrahydro-4-quinazolinone;

2-chloromethylthio-3-o-tolyl-6-sulfamyl-7-chloro-1,2,3,4-tetrahydro-4-quinazolinone;
2-dichloromethylthio-3-o-tolyl-6-sulfamyl-7-chloro-1,2,3,4-tetrahydro-4-quinazolinone;
2-trichloromethylthio-3-o-tolyl-6-sulfamyl-7-chloro-1,2,3,4-tetrahydro-4-quinazolinone;
2-phenylethylthio-3-o-tolyl-6-sulfamyl-7-chloro-1,2,3,4-tetrahydro-4-quinazolinone;
2-(3'-sulfamyl-4'-chlorophenylthio)-3-o-tolyl-6-sulfamyl-7-chloro-1,2,3,4-tetrahydro-4-quinazolinone;
2-(3'-sulfamyl-4'-chlorobenzylthio)-3-o-tolyl-6-sulfamyl-7-chloro-1,2,3,4-tetrahydro-4-quinazolinone;
2-methylthio-3-(o-hydroxyphenyl)-6-sulfamyl-7-chloro-1,2,3,4-tetrahydro-4-quinazolinone;
2-methylthio-3-(o-methoxyphenyl)-6-sulfamyl-7-chloro-1,2,3,4-tetrahydro-4-quinazolinone;
2-methylthio-3-(p-aminophenyl)-6-sulfamyl-7-chloro-1,2,3,4-tetrahydro-4-quinazolinone;
2-methylthio-3-(2'-methyl-4'-aminophenyl)-6-sulfamyl-7-chloro-1,2,3,4-tetrahydro-4-quinazolinone;
2-ethylthio-3-(2'-methyl-3'-sulfamylphenyl)-6-sulfamyl-7-chloro-1,2,3,4-tetrahydro-4-quinazolinone;
2-propylthio-3-(2'-methyl-3'-sulfamylphenyl)-6-sulfamyl-7-trifluoromethyl-1,2,3,4-tetrahydro-4-quinazolinone;
2-ethylthio-3-(2'-methyl-3'-chlorophenyl)-6-sulfamyl-7-trifluoromethyl-1,2,3,4-tetrahydro-4-quinazolinone;
2-methylthio-3-(2'-methyl-3'-chlorophenyl)-6-methylaminosulfonyl-7-chloro-1,2,3,4-tetrahydro-4-quinazolinone;
2-ethyl-3-(2'-sulfamylphenyl)-6-sulfamyl-7-chloro-1,2,3,4-tetrahydro-4-quinazolinone;
2-cyclopentylmethylthio-3-o-tolyl-6-sulfamyl-7-chloro-1,2,3,4-tetrahydro-4-quinazolinone;
2-cyclobutylthio-3-o-tolyl-6-sulfamyl-7-chloro-1,2,3,4-tetrahydro-4-quinazolinone;
2-cyclobutylthio-3-o-tolyl-6-sulfamyl-7-trifluoromethyl-1,2,3,4-tetrahydro-4-quinazolinone;
2-cyclopropylmethylthio-3-o-tolyl-6-sulfamyl-7-chloro-1,2,3,4-tetrahydro-4-quinazolinone;
2-cyclopropylthio-3-o-tolyl-6-sulfamyl-7-trifluoromethyl-1,2,3,4-tetrahydro-4-quinazolinone;
2-methylthio-3-benzyl-6-sulfamyl-7-chloro-1,2,3,4-tetrahydro-4-quinazolinone;
2-cyclohexylthio-3-o-tolyl-6-sulfamyl-7-chloro-1,2,3,4-tetrahydro-4-quinazolinone;
1-methyl-2-methylthio-3-o-tolyl-6-sulfamyl-7-chloro-1,2,3,4-tetrahydro-4-quinazolinone;
1-isopropyl-2-methylthio-3-o-tolyl-6-sulfamyl-7-chloro-1,2,3,4-tetrahydro-4-quinazolinone;
2-methylthio-3-(2'-mthyl-4'-chlorophenyl)-6-sulfamyl-7-chloro-1,2,3,4-tetrahydro-4-quinazolinone;
2-cyclobutylmethylthio-3-o-tolyl-6-sulfamyl-7-chloro-1,2,3,4-tetrahydro-4-quinazolinone;
2-methylthio-3-(2'-trifluoromethyl-4'-aminophenyl)-6-sulfamyl-7-chloro-1,2,3,4-tetrahydro-4-quinazolinone;
the sodium salt of 2-methylthio-3-o-tolyl-6-sulfamyl-7-chloro-1,2,3,4-tetrahydro-4-quinazolinone,
and the potassium salt of 2-methylthio-3-o-tolyl-6-sulfamyl-7-chloro-1,2,3,4-tetrahydro-4-quinazolinone.

The above compounds have diuretic properties similar to the compounds of application Ser. No. 517,995.
Other suitable diuretic compounds are tabulated below in Table I.

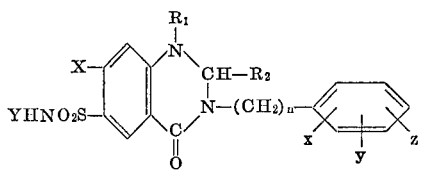

| R1 | R2 | x | y | z | X | Y | n |
|---|---|---|---|---|---|---|---|
| H | SCH₃ | H | H | H | Cl | H | 0 |
| Me | SCH₃ | H | H | H | Cl | H | 0 |
| H | SCH₃ | 2-Me | H | H | Cl | H | 0 |
| H | SCH₃ | 2-Me | H | H | Cl | H | 0 |
| H | SCH₃ | 2-Me | H | H | Cl | H | 1 |
| H | SCH₂ | 2-Me | H | H | Cl | H | 2 |
| H | SCH₃ | 2-Me | H | H | Cl | H | 3 |
| H | SCH₃ | 2-Me | H | H | Cl | H | 4 |
| H | SCH₃ | 2-Me | 3-Me | H | Cl | H | 0 |
| H | SCH₃ | 2-Me | 3-Me | 4-Me | Cl | H | 0 |
| H | SCH₃ | 2-Me | 4-OH | H | Cl | H | 0 |
| H | CH₃ | 2-Me | 4-OMe | H | Cl | H | 0 |
| H | SCH₃ | 2-Me | 4-NH₂ | H | Cl | H | 0 |
| H | SCH₃ | 2-Me | 4-NO | H | Cl | H | 0 |
| H | SCH₃ | 2-Me | 4-Cl | H | Cl | H | 0 |
| H | SCH₃ | 2-Me | 4-Br | H | Cl | H | 0 |
| H | SCH₃ | 2-Me | 4-F | H | Cl | H | 0 |
| H | SCH₃ | 2-Me | 4-CF₃ | H | Cl | H | 0 |
| H | SCH₃ | 2-Me | H | H | Cl | Me | 0 |
| H | SCH₃ | 2-Me | H | H | F | H | 0 |
| H | SCH₃ | 2-Me | H | H | CF₃ | H | 0 |
| H | SCH₃ | 2-Me | H | H | Br | H | 0 |
| H | SCH₃ | 2-Me | H | H | Cl | H | 1 |
| H | SEt | H | H | H | Cl | H | 0 |
| H | SEt | 2-Me | H | H | Cl | H | 0 |
| H | SEt | 2-Me | H | H | Cl | H | 1 |
| H | SEt | 2-Me | H | H | Cl | H | 2 |
| H | SEt | 2-Me | 3-Me | H | Cl | H | 0 |
| H | SEt | 2-Me | 4-OH | H | Cl | H | 0 |
| H | SEt | 2-Me | 4-OMe | H | Cl | H | 0 |
| H | SEt | 2-Me | 4-NH₂ | H | Cl | H | 0 |
| H | SEt | 2-Me | 4-Cl | H | Cl | H | 0 |
| H | SEt | 2-Me | 4-F | H | Cl | H | 0 |
| H | SEt | 2-Me | 4-CF₃ | H | Cl | H | 0 |
| H | SEt | 2-Me | 4-CF₃ | H | Cl | Me | 0 |
| H | SPh | H | H | H | Cl | H | 0 |
| H | SPh | 2-Me | H | H | Cl | H | 0 |
| H | SPh | 2-Me | H | H | Cl | H | 1 |
| H | SPh | 2-Me | H | H | Cl | H | 2 |
| H | SPh | 2-Me | 3-Me | H | Cl | H | 0 |
| H | SPh | 2-Me | 4-OH | H | Cl | H | 0 |
| H | SPh | 2-Me | 4-OMe | H | Cl | H | 0 |
| H | SPh | 2-Me | 4-NH₂ | H | Cl | H | 0 |
| H | SPh | 2-Me | 4-Cl | H | Cl | H | 0 |

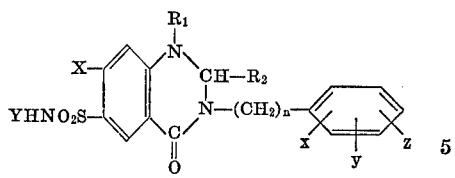

| R₁ | R₂ | x | y | z | X | Y | n |
|---|---|---|---|---|---|---|---|
| H | SPh | 2-Me | 4-F | H | Cl | H | 0 |
| H | SPh | 2-Me | 4-CF₃ | H | Cl | H | 0 |
| H | SPh | 2-Me | 4-CF₃ | H | Cl | Me | 0 |
| H | SCH₂Ph | 2-Me | H | H | Cl | H | 0 |
| H | SCH₂Ph | 2-Me | 3-Cl | H | Cl | H | 0 |
| H | SCH₂Ph | 2-Me | H | H | Cl | H | 1 |
| H | SCH₂Ph | 2-Me | H | H | Cl | H | 2 |
| H | SCH₂Ph | 2-Me | 3-Me | H | Cl | H | 0 |
| H | SCH₂Ph | 2-Me | 4-OH | H | Cl | H | 0 |
| H | SCH₂Ph | 2-Me | 4-OMe | H | Cl | H | 0 |
| H | SCH₂Ph | 2-Me | 4-NH₂ | H | Cl | H | 0 |
| H | SCH₂Ph | 2-Me | 4-Cl | H | Cl | H | 0 |
| H | SCH₂Ph | 2-Me | 4-F | H | Cl | H | 0 |
| H | SCH₂Ph | 2-Me | 4-CF₃ | H | Cl | H | 0 |
| H | SCH₂Ph | 2-Me | 4-CF₃ | H | Cl | Me | 0 |
| H | SCH₂Ph | 2-Et | H | H | Cl | H | 0 |
| H | S—⟨⟩—Cl | 2-Me | H | H | Cl | H | 0 |
| H | S—⟨⟩—Me | 2-Me | H | H | Cl | H | 0 |
| H | S—⟨M⟩—CH₃ | 2-Me | H | H | Cl | H | 0 |
| H | SCH₂CH₂Ph | 2-Me | H | H | Cl | H | 0 |
| H | SCH₂CH₂—⟨⟩—OMe | 2-Me | H | H | Cl | H | 0 |
| H | SCH₂CH₂—⟨⟩—NH₂ | 2-Me | H | H | Cl | H | 0 |

NOTE: Me=Methyl; Et=Ethyl; Ph=Phenyl.

The following synthetic scheme is given to illustrate the preparation of compounds of this invention. Other compounds than that shown can be prepared by modifications well known to the art. Also compounds of this invention may be made by modifications of the method shown in my application Ser. No. 517,995 as will also be apparent.

PREPARATION OF 2-METHYLTHIO-3-(O-TOLYL)- 6 - SULFAMYL-7-CHLORO-1,2,3,4-TETRAHYDRO- 4-QUINAZOLINONE

Synthetic route

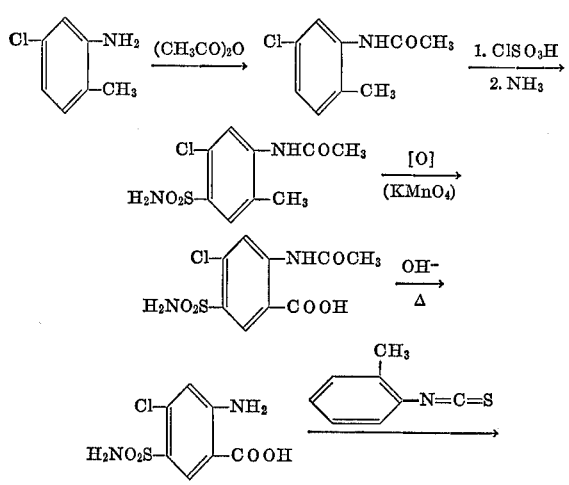

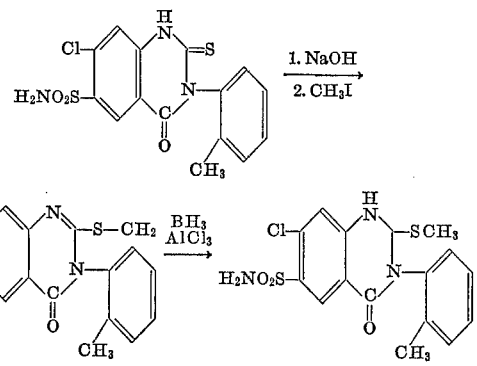

The other compounds of this invention can be made by modification of ingredients and quantities of the above example as is well understood by those skilled in the art.

From pharmacology tests run on 2-methylthio-3-o-tolyl- 6 - sulfamyl - 7-chloro - 1,2,3,4 - tetrahydro-4(3H)-quinazolinone and other indications and analogy the compounds of this invention are effective diuretics, saluretics, and antihypertensives with low toxicity. For example, the following is a summary of the pharmacology on the above 2-methylthio compound.

SUMMARY (a) Symptomatology and Acute LD50 in mice:

Orally—LD50 1000 mg./kg. (48 hours) no symptoms at 1000 mg./kg.

Interperitoneal—LD50 316 mg./kg. (48 hours) some hypothermia and decreased spontaneous motor activity at 316 mg./kg.

(b) Cardiovascular in dog: Doses intravenously up to 10 mg./kg. were administered. There were no changes in cardiovascular system.

(c) Diuretic assay in rats: When administered by the oral route in initial assays measuring output of urine (ml./kg.), Na+, and Cl− (meg./kg.) at 4 hours and 21 hours after drug administration, S720–22 was found to promote water and salt loss, has a rapid onset and prolonged action, and appears to have a potency on volume diuresis better than that of quinethazone.

The compounds of this invention when used in the same manner and in dosage amounts as for hydrochlorothiazide are safe and effective diuretics.

In the preceding specification the temperatures, wherever given, are in degrees centigrade.

Various modifications of the structural formula on column 1 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3-position, and thio groups in the 2-position.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the formula:

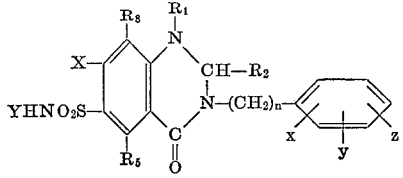

or pharmaceutically acceptable salts thereof; in which X is halogen or trifluoromethyl; Y is hydrogen or loweralkyl; $R_1$ is hydrogen or loweralkyl; $R_2$ is loweralkylthio, loweralkylphenylthio, phenylloweralkylthio, lowercycloalkylthio, lowercycloalkylloweralkylthio, phenylthio, or said groups having halogen, loweralkyl, amino, sulfamyl or nitro substituted in the phenyl ring or in the ring of the cycloalkyl or in the alkyl group; $R_5$ and $R_8$ are hydrogen, loweralkoxy, loweralkyl, loweralkoxyloweralkyl; x is hydrogen, loweralkyl, hydroxy, loweralkoxy, loweralkoxyloweralkyl, $NH_2$, sulfamyl, halogen, or trifluoromethyl; y and z are any of the members of x, and n is an integer from 0–4.

2. A compound of claim 1 wherein X is chlorine, Y is hydrogen, $R_1$ is hydrogen, $R_2$ is benzylthio, x is ortho-methyl, both y and z are hydrogen, and n is 0.

3. A compound of claim 1 wherein X is chlorine, Y is hydrogen, $R_1$ is hydrogen, $R_2$ is methylthio, x is ortho-methyl, both y and z are hydrogen, and n is 0.

4. A compound of claim 1 wherein X is chlorine, Y is hydrogen, $R_1$ is hydrogen, $R_2$ is chloromethylthio, x is ortho-methyl, both y and z are hydrogen, and n is 0.

5. A compound of claim 1 wherein X is chlorine, Y is hydrogen, $R_1$ is hydrogen, $R_2$ is benzylthio, x is ortho-trifluoromethyl, both y and z are hydrogen, and n is 0.

6. A compound of claim 1 wherein X is trifluoromethyl, Y is hydrogen, $R_1$ is hydrogen, $R_2$ is benzylthio, x is ortho-methyl, both y and z are hydrogen, and n is 0.

References Cited
UNITED STATES PATENTS

| | | | |
|---|---|---|---|
| 3,440,244 | 4/1969 | McLamore et al. | 260—256.5 |
| 3,458,513 | 7/1969 | Shetty | 260—256.5 |

ALEX MAZEL, Primary Examiner

R. J. GALLAGHER, Assistant Examiner

U.S. Cl. X.R.

424—79, 251

PO-1050
(5/69)

UNITED STATES PATENT OFFICE
CERTIFICATE OF CORRECTION

Patent No. 3,549,637      Dated   December 22, 1970

Inventor(s)   BOLA VITHAL SHETTY

It is certified that error appears in the above-identified patent and that said Letters Patent are hereby corrected as shown below:

Column 1, line 9, change "1977" to read - - 1986 - -.

Signed and sealed this 12th day of September 1972.

(SEAL)
Attest:

EDWARD M. FLETCHER, JR.
Attesting Officer

ROBERT GOTTSCHALK
Commissioner of Patents